Patented Feb. 12, 1946

2,394,962

UNITED STATES PATENT OFFICE 2,394,962

CYANOETHYLATED PRODUCTS AND PREPARATION THEREOF

Herman A. Bruson, Philadelphia, Pa., assignor to The Resinous Products & Chemical Company, Philadelphia, Pa., a corporation of Delaware No Drawing. Application March 2, 1943, Serial No. 477,763

6 Claims. (Cl. 260—464)

This invention relates to a method for the cyanoethylation of ketones having in juxtaposition to the ketonic carbonyl group a carbon atom bearing at least one reactive hydrogen atom and to the products thus obtained. More particularly, the present invention relates to the cyanoethylation of esters and substituted amides of a carboxylic acid which contains in α-position to the modified carboxylic acid group a CH₂ group activated by a radical which contains an atom having a multiple bond directly connected thereto, said atom being attached to said CH₂ group. Such a CH₂ group is specifically found in functional derivatives of acetoacetic acid and, more particularly, the esters, amides, and nitriles thereof.

This application combines in part the disclosure of application Serial No. 389,332, filed April 19, 1941, and in part the disclosure of application Serial No. 436,619, filed March 28, 1942.

According to this invention, acrylonitrile is reacted in the presence of an alkaline condensing agent with a ketone having an active methyl, methylene, or methenyl group immediately adjacent to its carbonyl group. By the reaction, a β-cyanoethyl radical is attached to the carbon atom adjacent to the carbonyl group. If more than one hydrogen is present on this carbon atom, then more than one cyanoethyl group may be introduced.

In particular, one or two molecules of acrylonitrile may be reacted in the presence of an alkaline condensing agent with a functional derivative of acetoacetic acid, such as an acetoacetic ester, nitrile or substituted amide, whereby one or two cyanoethyl radicals become attached to the carbon atom which is in α-position to the modified carboxylic acid group of the acetoacetic chain. This reaction is conveniently represented as follows:

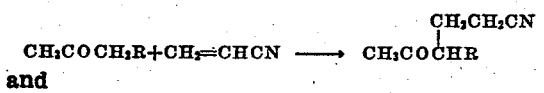

and

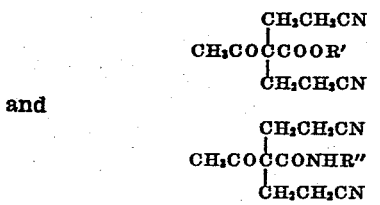

wherein R represents a modified carboxylic acid group, particularly a carboxylic ester or carboxylic substituted amide radical. Obviously, the monosubstituted monocyanoethylated product can react with acrylonitrile to form the dicyanoethylated product. Specifically, the final end products have the structures:

$$\begin{array}{c} \text{CH}_2\text{CH}_2\text{CN} \\ | \\ \text{CH}_3\text{COCCOOR}' \\ | \\ \text{CH}_2\text{CH}_2\text{CN} \end{array}$$

and $$\begin{array}{c} \text{CH}_2\text{CH}_2\text{CN} \\ | \\ \text{CH}_3\text{COCCONHR}'' \\ | \\ \text{CH}_2\text{CH}_2\text{CN} \end{array}$$

wherein R' and R'' represent alkyl, aryl, aralkyl, and cycloalkyl groups or such groups containing neutral substituents.

Among the alkaline condensing agents which have been found effective for promoting the reaction are the oxides, hydroxides, hydrides, amides, and alcoholates of the alkali metals or the alkali metals themselves. Similarly, the alkaline earth metals and their alkaline compounds may be used. There may also be used one of the strongly basic non-metallic hydroxides such as the quaternary ammonium hydroxides. Of these a particularly effective product is the aqueous solution containing 40% of trimethyl benzyl ammonium hydroxide which is available commercially under the trade name of "Triton B." One or several of these materials are suspended or, preferably, dissolved in the ketone itself or in a solution of the ketone in an inert liquid, such as dioxane, ether, or benzene, or in a liquid which is less reactive than the reacting ketone, such as water, or tertiary butyl alcohol.

The quantity of alkaline condensing agent required is relatively small, amounts of the order of 1% to 10% on the combined weight of the reactants usually being sufficient. Since the condensation ceases if the alkali is depleted by side reactions or impurities of an acid nature in the starting materials, it is advantageous to test the reaction mixture for alkalinity towards red litmus from time to time during the condensation and, if an alkaline reaction is no longer shown, to add more alkali to make up for the loss. After the reaction is substantially complete, it is often desirable to neutralize the reaction mixture before the desired product is isolated.

The reaction is applicable to a wide variety of ketones of the aliphatic, arylaliphatic, aromatic, cycloaliphatic, and heterocyclic series, including saturated or unsaturated mono-ketones or poly-ketones. The ketones may contain other functional groups than the carbonyl group so long as they do not readily destroy the alkaline condensing agent used. For example, these groups may be chloro, bromo, acyl, alkoxy, aryloxy, thioether, tert.-amino, sulfonyl, carbalkoxy, carbamyl, thiocyano, or cyano groups. The ketone may contain more than one active methyl, methylene, or methenyl group.

Among the typical ketones having reactive groups suitable for the purpose of this invention may be mentioned the following: Acetone, phenoxyacetone, cyano-acetone, ethoxy-acetone, acetophenone, p-methyl-acetophenone, N-methyltriacetonamine, acetyl-p-cymene, acetyl tetrahydronaphthalene, p-acetyl diphenyl, acetyl anthracene, acetyl phenanthrene, p-methoxyacetophenone, p-chloro-acetophenone, p-bromoacetophenone, methyl-β-naphthyl ketone, acetyl cyclohexane, cyclopentanone, cyclohexanone, o-, m-, or p-methyl cyclohexanone, o-methallyl cyclohexanone, o-, m-, or p-phenyl cyclohexanone, o- or p-cyclohexyl-cyclohexanone, o- or p-benzyl cyclohexanone, menthone, p-tert.-butyl cyclohexanone, p-tert.-amyl cyclohexanone, o-cyclohexylidene cyclohexanone, acetonyl acetone, diacetone alcohol, mesityl oxide, phorone, methyl ethyl ketone, methyl propyl ketone, methyl isobutyl ketone, di-isopropyl ketone, methyl-n-amyl ketone, di-n-propyl ketone, methyl-n-hexyl ketone, 5-ethyl-nonanone-2, methyl heptadecyl ketone, propiophenone, butyrophenone, stearophenone, 1,8-dibenzoyl octane, 1,4-dibenzoyl butane, dibenzyl ketone, desoxybenzoin, benzal acetone, dibenzal acetone, α-tetralone, furfural acetone, furfural-acetophenone, acetophopanol, cholestanone, androsterone, acetoacetic ester, benzoyl acetic ester, acetoacetic amide, acetoacetic nitrile, acetoacetanilide, 2-acetothienone, and other aliphatic, aromatic, arylaliphatic, cycloaliphatic, and heterocyclic ketones having one or more reactive hydrogen atoms attached to a carbon atom contiguous to a C=O group.

Typical acetoacetic acid compounds which can be used are the methyl, ethyl, isopropyl, butyl, benzyl or cyclohexyl esters, the anilide, chloroanilide, ethyl amide, butylamide, laurylamide or cetyl amide, the chloro-anilide and homologues thereof. The exact nature of the ester group or amide group is not a determining factor in this reaction, any ester or substituted amide group being permissible.

Depending upon the number of available hydrogen atoms in the reactive methyl, methylene, or methenyl groups contiguous to carbonyl in the ketones used, and upon the quantity of acrylonitrile employed, one or more β-cyanoethyl groups may be introduced. The condensation takes place readily at temperatures from about 0° to about 80° C., although initial temperatures of 25° C. to 60° C. are preferred. The reaction is usually exothermal so that cooling, at least during the initial part of the condensation, is generally advantageous in order to control the vigor of the reaction and to prevent undesired polymerization or side reactions. In this connection, it is sometimes desirable to add inhibitors such as hydroquinone, catechol, finely divided copper, copper compounds, or sulfur, etc.

In general, methyl ketones having the formula R—CO—CH₃, where R is aryl (as in acetophenone and its homologues), readily take up as many as three mols of acrylonitrile as follows:

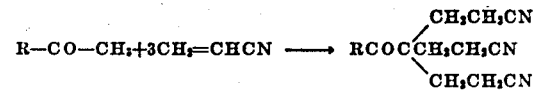

whereas cyclic ketones having the carbonyl between two —CH₂— groups, as in cyclopentanone, cyclohexanone, and their homologues, readily take up as many as four mols of acrylonitrile as follows:

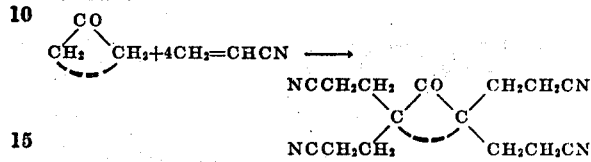

Where there is a choice between a methylene and a methyl group, as in methyl ethyl ketone and its homologues, the cyanoethyl radical appears to replace the hydrogen of the methylene group first. For example, methyl ethyl ketone, methyl-n-amyl ketone, methyl-n-hexyl ketone give crystalline di-cyanoethylation products which, however, do not readily show the iodoform test characteristic of —COCH₃ groups. Ketones such as acetoacetic ester, amide, or nitrile readily take up two mols of acrylonitrile to di-cyanoethylate the —CH₂— group:

CH₃COCH₂COOC₂H₅+2CH₂=CHCN ⟶

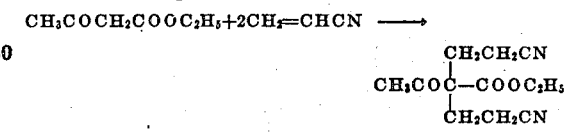

Where one or more —CH— groups are contiguous to carbonyl, each reactive hydrogen atom of the methenyl groups can be replaced by —CH₂—CH₂—CN; for example, diisopropyl ketone yields

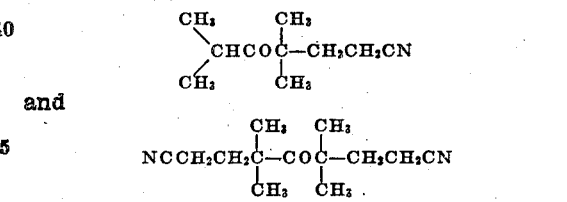

Finally, unsaturated ketones, for example, mesityl oxide, take up two mols of acrylonitrile to form a di-cyanoethylated product. The product can be further cyanoethylated on its reactive methyl groups.

The β-cyanoethylation products obtainable by the present process are new compounds. They are useful as intermediates for the preparation of monocarboxylic or polycarboxylic acids, amides, esters, amines, or polyamines, amidines, amino acids, amino alcohols, or thio-amides by the usual reactions characteristic of the nitrile group. Many of the compounds may find uses in diverse fields, including synthetic resins, artificial fibers, plastics, plasticizers, pharmaceuticals, insecticides, textile finishing and other commercial applications.

The following examples illustrate this invention, it being understood that, although trimethyl benzyl ammonium hydroxide is the preferred alkaline condensing agent, others, such as sodium ethylate, potassium tert.-amylate, sodium methylate, potassium hydroxide, sodamide, sodium metal, sodium hydride, sodium oxide, sodium hydroxide, tetramethyl ammonium hydroxide, tetraethanol-ammonium hydroxide, benzyl triethyl ammonium hydroxide and other quaternary ammonium hydroxides may be used.

Example 1

(a) To a solution of 49 grams of cyclohexanone (0.5 mol) in 200 grams of benzene, there was added 5 grams of an aqueous 40% solution of trimethylbenzylammonium hydroxide. The mixture was stirred rapidly in a glass vessel fitted with a thermometer and reflux condenser, while 106 grams of acrylonitrile (2 mols) was added dropwise during a two-hour period and while the reaction mixture was maintained between 30° and 45° C. by means of external cooling. The mixture was stirred for about four hours longer until no more heat was evolved. At the end of this time, a thick magma of crystalline material had formed. This was filtered off sharply by suction, washed with a little methanol, and dried. There was obtained 139 grams of small, cream-colored crystals. The product can be recrystallized from acetone in the form of colorless, fine needles, melting when pure at 165° C. Its analysis corresponds to tetra-($\beta$-cyanoethyl)-cyclohexanone having the formula:

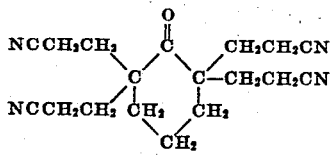

It is only slightly soluble in benzene or methanol. When boiled with aqueous 10% potassium hydroxide solution, the tetra-($\beta$-cyanoethyl)-cyclohexanone is readily hydrolyzed to the corresponding polycarboxylic acid which separated in the form of colorless crystals upon acidifying the reaction mixture with hydrochloric acid. Upon recrystallization from hot water, it forms colorless needles melting at 179°–180° C.

(b) By using only 53 grams of acrylonitrile (1 mol) in the above procedure, the yield of tetra-($\beta$-cyanoethyl)-cyclohexanone fell to 57 grams. From the filtrate there were isolated two products, one a colorless oil boiling at 150°–160° C./10 mm. consisting of mono-($\beta$-cyanoethyl)-cyclohexanone:

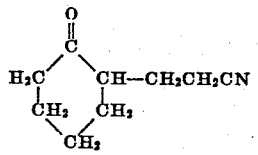

and the other a di-(cyanoethyl)-cyclohexanone boiling at 197°–207° C./1 mm., which crystallized from benzene in colorless needles melting when pure at 69.5° C.

In place of trimethyl benzyl ammonium hydroxide, one may use 2 grams of sodium methylate as condensation catalyst.

In the same manner, o-, m-, or p-alkyl-, aryl-, aralkyl-, cycloalkyl, or cyano-cyclohexanones can be used in place of cyclohexanone itself.

(c) By adding 42.4 grams of acrylonitrile to a stirred solution of 2 grams of 40% potassium hydroxide solution, 50 grams of dioxane, and 19.6 grams of cyclohexanone at 40°–45° C., there was obtained 42 grams of tetra-($\beta$-cyanoethyl)-cyclohexanone, having a melting point of 165° C.

(d) By adding 63.5 grams of acrylonitrile to a stirred solution of 5 grams of aqueous 40% trimethyl benzyl ammonium hydroxide, 200 grams of benzene, and 44.8 grams of orthomethyl cyclohexanone at 30°–40° C., there was obtained, after washing and drying, 103 grams of a syrup consisting essentially of tri-($\beta$-cyanoethyl)-o-methyl cyclohexanone. It boiled between 275°–285° C./1 mm.

Example 2

To a solution of 144 grams of methyl ethyl ketone (2 mols) and 144 grams of benzene, there was added 10 grams of an aqueous 40% solution of trimethyl benzyl ammonium hydroxide. The mixture was stirred and cooled to 30°–35° C. while 212 grams of acrylonitrile (4 mols) was added dropwise during two and one-half hours. After the addition, the mixture was stirred for three hours. There was then added 50 cc. of water and sufficient 10% hydrochloric acid to render the solution slightly acidic. The benzene layer was separated, filtered from a small amount of polymer, and the benzene removed by evaporation. The residual oil was then distilled under reduced pressure (1 mm.). After a small forerun, the main fraction came over at 184°–195° C./1 mm. as a pale yellow oil weighing 177 grams. On standing, it solidified to a crystalline mass which, upon recrystallization from benzene, separated in large, colorless prisms melting at 67° C. Its analysis corresponds to di-($\beta$-cyanoethyl)-butanone. The residual still residue weighed 108 grams and formed a pitch-like mass comprising higher cyanoethylation products of butanone. When boiled with aqueous 10% potassium hydroxide solution, the di-($\beta$-cyanoethyl)-butanone is readily hydrolyzed to the corresponding dicarboxylic acid, which can be extracted from the acidified dried reaction mixture with boiling ethylene dichloride, and crystallizes therefrom, upon cooling, in the form of colorless crystals melting at 125° C.

Example 3

To a solution of 42 grams of cyclopentanone (0.5 mol) in 200 grams of benzene, there was added 5 grams of an aqueous 40% solution of trimethyl benzyl ammonium hydroxide. The mixture was stirred and cooled to 35°–45° C. while 106 grams of acrylonitrile (2 mols) was added dropwise during one and one-half hours. Crystals began to separate within a few minutes after the addition was begun. As the reaction proceeded, it was necessary to add 200 cc. of benzene to prevent clogging of the stirrer by the crystalline mush. The mixture was allowed to stand for eighteen hours before the crystals were filtered by suction. The product can be recrystallized from hot methyl ethyl ketone or glycol monoethyl ether ("Cellosolve") from which it separates in colorless crystals melting, when pure, at 175° C. Its analysis corresponds to tetra-($\beta$-cyanoethyl)-cyclopentanone, having the formula:

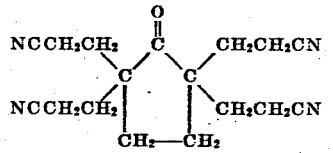

It is only very slightly soluble in benzene, toluene, or dioxane. The yield was 144 grams, which corresponds to 97.3% of theory.

Example 4

212 grams of acrylonitrile was added dropwise during the course of two and one-half hours to a stirred mixture of 150 grams of dioxane, 228 grams of methyl-n-amyl ketone, and 10 grams of aqueous 38% trimethyl benzyl ammonium hydroxide solution while the reaction mixture was maintained between 30° and 33° C. by external cooling. After the addition, the solution was stirred for twenty hours at room temperature. It was then acidified with dilute hydrochloric acid, taken up in ethylene dichloride, and the solution washed thoroughly with water. The oil layer was evaporated to dryness under reduced pressure on a steam bath. The residual oil, weighing 400 grams, was distilled in vacuo. After a small forerun of unchanged ketone, a fraction distilled over at 195°–200° C./1–2 mm. as a colorless oil which solidified to a crystalline mass. The yield was 175 grams. Upon recrystallization from alcohol, it formed colorless crystals melting at 63° C., the analysis of which corresponds to that for a di-(cyanoethyl)-heptanone. The residual pitch consisted of higher cyanoethylation products.

*Example 5*

To a solution of 128 grams of octanone-2 in 200 grams of benzene, there was added 5 grams of an aqueous 40% solution of trimethyl benzyl ammonium hydroxide. The mixture was stirred and cooled to 30°–40° C. while 106 grams of acrylonitrile was added dropwise thereto during a two-hour period. The mixture was stirred thereafter for one hour, then washed with water, followed by dilute hydrochloric acid, and then with water. The benzene layer was separated, filtered from a small amount of resin, and the filtrate evaporated under reduced pressure. The residual oil was distilled in high vacuo. The fraction boiling at 195°–200° C./1 mm. formed a pale yellow oil which crystallized on cooling. After recrystallization from ethanol, it formed colorless crystals melting, when pure, at 47° C. Its analysis corresponds to di-(β-cyanoethyl)-octanone The yield was 49 grams. The rest of the product boiled too high to be distilled without decomposition and consisted of a resinous mixture of higher poly-cyanoethylation products of octanone.

*Example 6*

To a solution of 63 grams of p-α,α,γ,γ-tetramethylbutyl cyclohexanone (0.3 mol) in 100 grams of dioxane, there was added 3 grams of an aqueous 40% solution of trimethyl benzyl ammonium hydroxide. The mixture was stirred and cooled to 30°–40° C. while 63.6 grams of acrylonitrile (1.2 mols) was added dropwise thereto during one and one-quarter hours. The mixture was stirred for about one hour longer at room temperature (25°–30° C.) and was then warmed to 43° C. for two hours. It was cooled, acidified with dilute hydrochloric acid, and washed with water. The oil was then dried on a steam bath under reduced pressure. When cold, it formed a pasty crystalline mass weighing 118 grams. The product can be recrystallized from boiling methanol. It separates in colorless needles melting, when pure, at 155°–156° C. Its analysis corresponds to tetra-(β-cyanoethyl)-tert.-octyl-cyclohexanone having the formula:

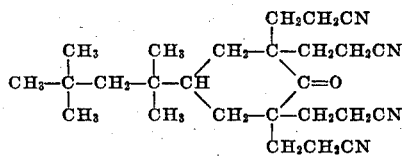

In the same manner, p-phenyl cyclohexanone, p-cyclohexyl-cyclohexanone, p-tert.-butyl-cyclohexanone, p-tert.-amyl-cyclohexanone, p-benzyl-cyclohexanone, or p-methyl-cyclohexanone can be used mol for mol in place of the tert.-octyl-cyclohexanone to yield the corresponding tetra-β-cyanoethylation products thereof.

*Example 7*

To a solution of 60 grams of acetophenone in 60 grams of dioxane containing 5 grams of aqueous 40% trimethyl benzyl ammonium hydroxide solution was added 79.5 grams of acrylonitrile dropwise during two hours, while the mixture was stirred and maintained between 30° and 40° C. by external cooling. During the addition, crystals began to separate. After the acrylonitrile had been added, the mixture was stirred one hour longer and filtered. There was obtained 79 grams of pinkish crystals which, upon recrystallization from glycol monoethyl ether ("Cellosolve") formed colorless needles melting at 128°–129° C., the analysis of which indicated the compound to be tris-(β-cyanoethyl)methyl phenyl ketone having the formula:

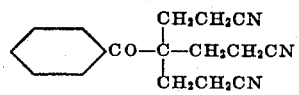

The original filtrate contains further quantities of the above compound, together with lower cyanoethylated material.

In place of acetophenone, one may use its nuclear substitution products, for example, its alkyl, aralkyl, aryl, cycloalkyl, alkoxy, aryloxy, halogen, or benzoyl derivatives, to obtain the corresponding tri-cyanoethylated products in the manner indicated above.

*Example 8*

To a solution of 34 grams of methyl-2-naphthyl ketone in 100 cc. of dioxane and 2 grams of aqueous 38% trimethyl benzyl ammonium hydroxide solution, there was added dropwise 31.8 grams of acrylonitrile during thirty-five minutes, while the reaction mixture was stirred and maintained between 20° and 35° C. by means of external cooling. The mixture was then stirred four hours longer at room temperature. The dark solution was acidified with dilute hydrochloric acid, poured into two liters of water, and the yellowish, viscous oil separated by taking it up in ethylene dichloride and washing the solution thoroughly with water. Upon evaporating away the ethylene dichloride under reduced pressure on a steam bath, there was obtained a reddish, viscous syrup weighing 64 grams. Upon the addition of 200 cc. of ethanol, the mixture crystallized. After recrystallization from hot ethanol, the product separated in colorless large plates melting at 122° C. The compound contains three cyanoethyl radicals and has the formula:

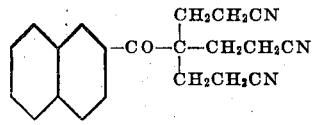

*Example 9*

To a solution of 37.3 grams of p-acetyl diphenyl in 150 grams of dioxane and 4 grams of aqueous 38% trimethyl benzyl ammonium hydroxide solution, there was added dropwise 31.8 grams of acrylonitrile during thirty minutes while the reaction mixture was stirred and maintained at 35°–40° C. by external cooling. After the mixture was stirred two hours longer at room temperature, it became crystalline. The crystals were filtered off and washed with a little dioxane.

The yield was 32 grams of white crystals. After recrystallization from dioxane, tri-(β-cyanoethyl)-acetyl-diphenyl having the formula:

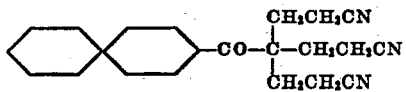

was obtained in the form of colorless plates melting at 178° C.

In place of acetyl diphenyl, one may use other acetylated polynuclear aromatic hydrocarbons such as acetyl-anthracene, acetyl-phenanthrene, acetyl-retene, and the like, to obtain the corresponding tri-cyanoethylated derivatives in the manner indicated above.

*Example 10*

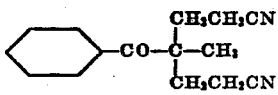

To a solution consisting of 26.8 grams of propiophenone (0.2 mol), 50 grams of dioxane and 2 grams of aqueous 38% trimethyl benzyl ammonium hydroxide solution, there was added dropwise 21.2 grams of acrylonitrile (0.4 mol) during twenty minutes while the reaction mixture was stirred and maintained between 25° and 32° C. by external cooling. The mixture was stirred for an additional five hours at 25° C., then acidified with dilute hydrochloric acid, and poured into 300 cc. of water. The oil layer was separated, taken up in ethylene dichloride, washed thoroughly with water, and the ethylene dichloride layer evaporated off on a steam bath under reduced pressure. The residual oil weighed 48 grams. It was mixed with an equal weight of ethanol and chilled, whereupon the product crystallized. After recrystallization from ethanol, the di-(β-cyanoethyl)-propiophenone formed colorless crystals melting at 66° C.

In place of propiophenone, its homologues, such as butyrophenone, stearophenone, or its nuclear alkyl, aryl, aralkyl, cycloalkyl, nitro, halogen, alkoxy, or aryloxy derivatives may be used to obtain the corresponding di-cyanoethylated derivatives in the manner indicated above.

*Example 11*

Acrylonitrile (10.6 grams) was added dropwise during fifteen minutes to a stirred solution of 70 grams of dioxane, 16.1 grams of 1,8-dibenzoyloctane, and 2 grams of aqueous 40% trimethyl benzyl ammonium hydroxide solution while the reaction mixture was maintained at 37°-45° C. by external cooling. The mixture was then stirred four hours longer at 25°-30° C. and then stirred with water containing sufficient hydrochlorid acid to neutralize the alkali. The oil was taken up in ethylene dichloride, the oil layer separated, washed, and concentrated under reduced pressure on a steam bath until all the solvent was removed. The residual oil, weighing 26 grams, was redissolved in benzene, filtered to remove traces of polymer, and the benzene removed by evaporation in vacuo at 80°-90° C. The final product was a viscous, reddish oil.

Its analysis indicated that it consisted essentially of tetra-(cyanoethyl)-dibenzoyl octane having the probable formula:

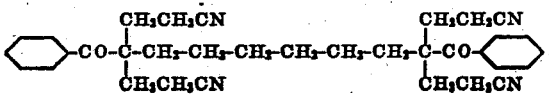

*Example 12*

(a) Two grams of powdered sodium methylate was added to 58 grams of methyl acetoacetate at 50°-60° C. The solution was cooled to 20° C. and stirred while 26.5 grams of acrylonitrile was added dropwise during fifteen minutes at 37°-40° C. while the mixture was cooled. The product was then stirred for two hours longer at 40° C. and allowed to stand eighteen hours at room temperature. It was then poured into dilute acetic acid, the oil layer separated, dissolved in toluene, filtered from a small amount of polymer, and the toluene filtrate washed, dried, and then distilled under reduced pressure. The fraction boiling at 141°-145° C./7 mm. was a colorless oil having the formula:

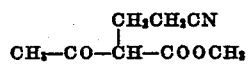

(b) To a solution of 58 grams of methyl acetoacetate, 100 grams of dioxane and 7 grams of aqueous 40% trimethyl benzyl ammonium hydroxide solution, there was added dropwise 53 grams of acrylonitrile while the solution was stirred and cooled to 30°-40° C. The mixture was stirred for one-half hour longer at room temperature and the crystalline product which resulted was filtered off. The yield was 54 grams. A further quantity was isolated by adding water to the filtrate.

The substance formed colorless crystals melting at 154° C. after recrystallization from acetone. Its analysis corresponds to di-(β-cyanoethyl)-acetoacetic methyl ester:

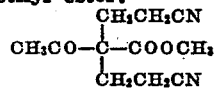

(c) By using 65 grams of ethyl acetoacetate in place of the methyl acetoacetate in the above example, the corresponding di-(β-cyanoethyl)-acetoacetic ethyl ester separated as a crystalline mass when the reaction mixture was poured into one liter of ice water. After recrystallization from ethanol, the compound formed colorless crystals melting at 82° C.

In the same manner, other esters of acetoacetic acid may be used, for example, the isopropyl, the butyl, the benzyl, phenyl or cyclohexyl esters.

*Example 13*

(a) To a solution of 53.1 grams of acetoacetanilide in 100 grams of dioxane containing 2 grams of aqueous 40% trimethyl benzyl ammonium hydroxide solution, there was added dropwise 31.8 grams of acrylonitrile while the mixture was stirred and cooled to 30°-33° C. When the exothermal reaction was finished, the mixture was warmed for two and one-half hours at 45°-50° C., then cooled, washed with water containing sufficient hydrochloric acid to neutralize the alkali, and finally thoroughly washed with water. The product separated as a heavy oil, which, after being dried on a steam bath under reduced pressure, formed a pale amber-colored, resinous mass. It was dissolved in hot ethanol from which it slowly crystallized on standing. The colorless, pure crystals obtained after repeated recrystallization from ethanol melted at 82° C. Analysis indicated the presence of two cyanoethyl groups corresponding to the formula:

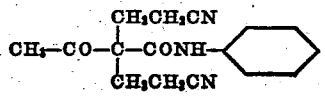

despite the fact that acetoacetanilide itself melts at 85° C. A mixed melting point of the two compounds, however, shows a big depression.

In the same manner, the ethylamide, butylamide, laurylamide or cetylamide of acetoacetic acid may be used in place of the anilide.

(b) To a solution of 63.5 grams of ortho-chloro-aceto-acetoanilide, 100 grams of dioxane and 2 grams of aqueous 40% trimethyl benzyl ammonium hydroxide solution, there was added dropwise, while the solution was stirred at 30°–36° C., 31.8 grams of acrylonitrile. The mixture was then heated at 40°–50° C. for three hours. The clear solution obtained was acidified with dilute hydrochloric acid, poured into ethylene dichloride, and washed with water. The ethylene dichloride was then evaporated off, under reduced pressure, on a steam bath. There was obtained 92 grams of a pale amber, resinous syrup which became crystalline when it was dissolved in ethanol and chilled. Upon recrystallization from ethanol, 66 grams of colorless crystals melting at 105° C. was obtained. Analysis indicated the presence of two cyanoethyl groups corresponding to the formula:

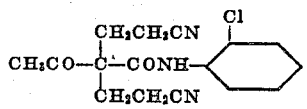

Despite the fact that ortho-chloro-acetoacetanilide itself melts at very nearly the same temperature, a mixed melting point of the two compounds shows a big depression.

(c) A mixture consisting of 100 grams of dioxane, 3 grams of aqueous 38% trimethyl benzyl ammonium hydroxide solution, and 73.8 grams of 2,5-dichloro-acetoacetanilide was stirred and warmed to 40° C. while 31.8 grams of acrylonitrile was gradually added. The mixture was heated for two and one-half hours at 40°–45° C., then cooled, neutralized with dilute hydrochloric acid, taken up in ethylene dichloride, and washed with water. The ethylene dichloride layer was separated and evaporated to dryness in vacuo on a steam bath. The residue, weighing 89 grams, was a viscous, sticky balsam which did not readily crystallize. On standing in chilled ethanol solution for some time, it gradually solidified to a crystalline mass which, after several recrystallizations from ethanol, formed colorless crystals melting at 121° C., containing by analysis two cyanoethyl radicals and having the formula:

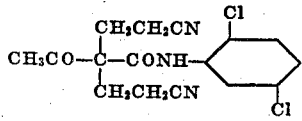

Example 14

To a solution of 29.4 grams of mesityl oxide (0.3 mol), 5 grams of aqueous 38% trimethyl benzyl ammonium hydroxide solution, and 50 grams of dioxane, there was added dropwise 31.8 grams of acrylonitrile (0.6 mol) during one-half hour while the reaction mixture was stirred and maintained between 25° and 32° C. by external cooling. The mixture was stirred thereafter for two and one-quarter hours. It was then acidified to bromthymol blue indicator with dilute hydrochloric acid, and stirred with an equal volume of ethylene dichloride. The solution was then washed with water and the ethylene dichloride layer separated and evaporated to dryness under reduced pressure. The residue, consisting of a partially crystalline syrup, weighed 55 grams. It was stirred with a little methanol and the solids filtered off. The yield was 20 grams. Upon recrystallization from methanol, the product formed colorless crystals melting at 116°–117° C., the analysis of which corresponds to that of a di-cyanoethylation product having the formula $C_{12}H_{16}N_2O$. The original filtrate contained a further quantity of the above crystals, together with a liquid mono-cyanoethylation product of mesityl oxide boiling at 110°–115° C./2 mm.

Example 15

To a clear solution of 58 grams of acetone and 9 grams of aqueous 14% trimethyl benzyl ammonium hydroxide solution, 159 grams of acrylonitrile was added dropwise while the solution was stirred and cooled to 30°–37° C. After the solution had stood for eighteen hours at room temperature, the crystalline reaction product was filtered off. Upon recrystallization from glycol monomethyl ether, it formed colorless crystals (12 grams) melting at 154° C., the analysis of which agreed with a tri-(cyanoethyl)-acetone. The filtrate, upon neutralization with dilute hydrochloric acid, washing with water, and concentration in vacuo on a steam bath, yielded 109 grams of a syrupy material, comprising higher cyanoalkylation products, which decomposes on distillation under reduced pressure.

Example 16

To a solution of 57 grams of acetonyl acetone in 100 grams of benzene was added 5 grams of aqueous 40% trimethyl benzyl ammonium hydroxide. The solution was stirred and held at 30°–35° C. by cooling while 106 grams of acrylonitrile was added dropwise during the course of one hour. The deep red-brown solution was stirred for twenty hours at the ordinary temperature and the crystalline product then filtered off by suction. After the crystals were washed with methanol to remove dark-colored impurities, the product (18 grams) was recrystallized from acetonyl acetone. It separated in colorless crystals, having a melting point of 180° C. and containing 16.45% nitrogen by analysis, apparently a tetra-($\beta$-cyanoethyl)-acetonyl acetone. The original filtrate contains a mixture of higher and lower cyanoethylation products. After being washed with water and dried, it forms a dark resin.

Example 17

To a solution of 138 grams of phorone, 138 grams of dioxane, and 9 grams of aqueous 38% trimethyl benzyl ammonium hydroxide solution, there was added dropwise during fifty minutes 53 grams of acrylonitrile while the reaction mixture was stirred and cooled at 31°–35° C. The mixture was stirred thereafter for twenty hours at 25° C., then acidified with dilute hydrochloric acid, taken up in ethylene dichloride, washed thoroughly with water, and the ethylene dichloride layer evaporated to dryness in vacuo on a steam bath. The residual oil, weighing 182 grams, was distilled in vacuo at 1 mm. After a forerun of 80 grams of unchanged phorone had come over between 65° and 110° C./1 mm., two main fractions were obtained, one of which, weighing 45 grams, was a pale yellow oil boiling at 120° C./1 mm., analyzing for a mono-cyanoethylation product of phorone. A second fraction boiling at 190°–200° C./1 mm., weighing 14 grams, formed a yellow oil analyzing for a dicyanoethylation product

Example 18

Acrylonitrile (21.2 grams) was added dropwise during forty minutes to a mixture of 21 grams of dibenzyl ketone, 50 grams of dioxane, and 2 grams of aqueous 38% trimethyl benzyl ammonium hydroxide at 30°–35° C. while the mixture was stirred. The mixture was allowed to stand for eighteen hours at 25° C. It was then neutralized with dilute hydrochloric acid and taken up in ethylene dichloride. The solution was washed with water and evaporated to dryness in vacuo on a steam bath. The residue was a viscous, sticky syrup weighing 42 grams, consisting essentially of a tetra-cyanoethylation product. It was soluble in methanol.

Example 19

To a solution of 30 grams of p-methoxyacetophenone, 50 grams of dioxane, and 2 grams of 38% trimethyl benzyl ammonium hydroxide, there was added dropwise with stirring 31.8 grams of acrylonitrile at a temperature of 35° C. After the mixture was stirred for several hours at 25° C., dilute hydrochloric acid was added until the mixture was acid to litmus. The product was mixed with ethylene dichloride and then washed with water. The ethylene dichloride layer was evaporated to dryness under reduced pressure on a steam bath. The residual oil, weighing 56 grams, became crystalline when it was stirred with a little methanol. The product, after recrystallization from methanol, separated in colorless needles melting at 133° C. and having the formula:

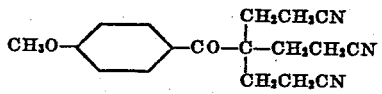

In the same manner, the p-ethoxy, p-phenoxy, and p-benzyloxy derivatives may be prepared from the corresponding p-substituted acetophenones.

Example 20

Acrylonitrile (31.8 grams) was added dropwise during the course of thirty minutes to a stirred solution consisting of 30.9 grams of p-chloro-acetophenone, 50 grams of dioxane, and 2 grams of aqueous 38% trimethyl benzyl ammonium hydroxide while the reaction mixture was cooled to 32°–37° C. The product began to crystallize out at the end of this time. After the mixture had stood for eighteen hours, it was neutralized with dilute hydrochloric acid and the crystals filtered off. The yield was 39 grams. Upon recrystallization from methanol, the product formed colorless stout needles melting at 141°–142° C. and having the formula:

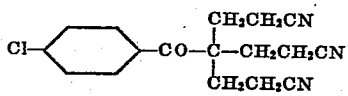

The original filtrate, upon evaporation, yielded 25 grams of viscous oil containing lower cyanoethylated products.

Example 21

To a solution of 19.2 grams of benzoylacetic ethyl ester, 50 grams of dioxane, and 2 grams of aqueous 38% trimethyl benzyl ammonium hydroxide, there was added dropwise 10.6 grams of acrylonitrile at 30°–32° C. while the mixture was stirred rapidly. The mixture was then heated for six hours at 45° C. The product was cooled, neutralized with dilute hydrochloric acid, taken up in ethylene dichloride, and washed thoroughly with water. The ethylene dichloride layer was then separated and evaporated to dryness in vacuo on a steam bath. The residual oil weighed 25 grams. Upon distillation at 1 mm., a pale yellow oil came over at 170°–175° C., containing 5.60% nitrogen by analysis and corresponding to the mono-cyanoethylation product having the formula:

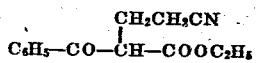

Example 22

To a solution consisting of 57 grams of di-isopropyl ketone, 60 grams of tertiary butanol, and 4 grams of aqueous 38% trimethyl benzyl ammonium hydroxide, there was added dropwise 53 grams of acrylonitrile during one hour while the reaction mixture was stirred and the temperature maintained at 33°–35° C. The mixture was stirred thereafter for two hours at 25° C., neutralized with dilute hydrochloric acid, taken up in an equal volume of ethylene dichloride, and washed with water. The ethylene dichloride layer was evaporated to dryness in vacuo on a steam bath. The residual oil weighed 95 grams. Upon distillation at 1 mm., it gave a fraction weighing 62 grams, boiling between 80° and 115° C. Upon refractionation in vacuo, this cut yielded 33 grams of monocyanoethyl-diisopropyl ketone as a colorless oil boiling at 128° C./10 mm., having a $n^d_{25°}=1.4428$ and $d_{25°}=0.9247$ and having the formula:

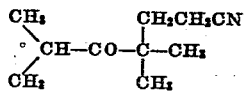

A higher boiling fraction distilling at 165°–170° C./1 mm. was also obtained as a colorless oil corresponding to the di-cyanoethylation product.

Example 23

21.2 grams of acrylonitrile was added dropwise during fifteen minutes to a stirred solution of 27 grams of p-bromo-acetophenone, 50 grams of dioxane, and 2 grams of aqueous 38% trimethyl benzyl ammonium hydroxide, while the reaction mixture was maintained between 30° and 40° C. The solution was then stirred for twenty-four hours at 25° C., acidified with dilute hydrochloric acid, mixed with 50 cc. of ethylene dichloride, and the crystals filtered off. The yield was 23 grams. After recrystallization from ethanol, the product formed colorless needles melting at 151°–152° C. and having the formula:

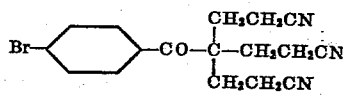

More of the above product can be recovered from the filtrate by evaporation and trituration with ethanol.

Example 24

31.8 grams of acrylonitrile was added dropwise during twenty-five minutes to a stirred solution consisting of 26.8 grams of p-methyl acetophenone, 50 grams of dioxane, and 2 grams of aqueous 38% trimethyl benzyl ammonium hydroxide at 33°–37° C. After standing for forty-eight hours, the mixture was neutralized with dilute hydrochloric acid and the crystalline product filtered off. The yield was 25 grams. After recrystallization from ethanol, the product formed colorless needles melting at 161°–162° C. and having the formula:

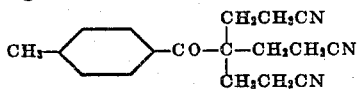

The filtrate contains a further quantity of the product.

*Example 25*

21.2 grams of acrylonitrile was added at room temperature to a mixture of 29.2 grams of α-tetralone, 50 grams of dioxane, and 4 grams of aqueous 40% trimethyl benzyl ammonium hydroxide solution. The mixture was stirred for twenty-four hours, then neutralized with dilute hydrochloric acid, washed with water, and distilled in vacuo. The fraction boiling at 250°–260° C./1 mm. formed a pale yellow oil which gradually solidified to a waxy crystalline mass. After recrystallization from ethanol, the product formed colorless crystals melting at 80° C. and having the formula:

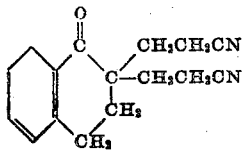

I claim:

1. A process which comprises reacting in the presence of a strongly basic quaternary ammonium hydroxide acrylonitrile and an ester of acetoacetic acid.

2. A process which comprises reacting in the presence of trimethyl benzyl ammonium hydroxide acrylonitrile and an ester of acetoacetic acid.

3. A process which comprises reacting in the presence of a strongly basic quaternary ammonium hydroxide two molecular proportions of acrylonitrile and one molecular proportion of an ester of acetoacetic acid.

4. A process which comprises reacting in the presence of trimethyl benzyl ammonium hydroxide as a catalyst and dioxane as a solvent two molecular proportions of acrylonitrile and one molecular proportion of an ester of acetoacetic acid.

5. A process which comprises reacting in the presence of a strongly basic quaternary ammonium hydroxide acrylonitrile and ethyl acetoacetate.

6. A process which comprises reacting in the presence of a strongly basic quaternary ammonium hydroxide acrylonitrile and methyl acetoacetate.

HERMAN A. BRUSON.